(12) United States Patent
Erdogan-Haug et al.

(10) Patent No.: US 8,404,778 B2
(45) Date of Patent: *Mar. 26, 2013

(54) CROSSLINKABLE SYRUP COPOLYMERS WITH AMINOALKYL (METH)ACRYLOYL SOLVENT MONOMERS

(75) Inventors: Belma Erdogan-Haug, St. Paul, MN (US); Maureen A. Kavanagh, Stanchfield, MN (US); Marie Aloshyna ep Lesuffleur, Minneapolis, MN (US); Larry R. Krepski, White Bear Lake, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,972

(22) Filed: Jun. 6, 2012

(65) Prior Publication Data

US 2012/0252980 A1    Oct. 4, 2012

Related U.S. Application Data

(62) Division of application No. 12/754,121, filed on Apr. 5, 2010, now Pat. No. 8,222,340.

(51) Int. Cl.
*C08F 6/00* (2006.01)
*C08F 8/30* (2006.01)
*C08L 33/06* (2006.01)
*C08L 67/00* (2006.01)
*C07C 69/54* (2006.01)

(52) U.S. Cl. ........ 524/556; 524/555; 524/560; 524/599; 524/602; 428/355 CN; 525/293; 560/222; 526/312

(58) Field of Classification Search .................. 524/556, 524/555, 560, 599, 602; 525/293; 428/355 CN; 526/312; 560/222

See application file for complete search history.

(56) References Cited

U.S. PATENT DOCUMENTS

| 2,138,763 | A | 11/1938 | Graves |
| 3,691,140 | A | 9/1972 | Silver |
| 4,166,152 | A | 8/1979 | Baker et al. |
| 4,636,432 | A | 1/1987 | Shibano et al. |
| 4,656,218 | A | 4/1987 | Kinoshita |
| 5,045,569 | A | 9/1991 | Delgado |
| 5,506,279 | A | 4/1996 | Babu et al. |
| 5,902,836 | A * | 5/1999 | Bennett et al. ............ 522/8 |
| 7,645,827 | B2 * | 1/2010 | Lewandowski et al. ...... 524/493 |
| 2005/0054767 | A1 | 3/2005 | Darling et al. |

FOREIGN PATENT DOCUMENTS

WO  WO 2006/125976  11/2006
WO  WO 2006/129974  12/2006

OTHER PUBLICATIONS

Korshunov et al., "Alkyl Esters of α,β-Unsaturated Acids with Functional Substituents in the Alkyl Group III. Full Acrylic and Methacrylic Esters of Polyhydric Amino Alcohols," Journal of Organic Chemistry of the USSR, vol. 4, 1968, pp. 1157-1161.

Bodnaryuk et al., "Esters of α,β-Unsaturated Acids with Functional Groups in the Alkoxy Radical," Journal of Organic Chemistry of the USSR, vol. 8, No. 7, Part 1, Jul. 1972, pp. 1389-1394.

PCT International Search Report for International Application No. PCT/US2011/029571.

* cited by examiner

*Primary Examiner* — Michael M Bernshteyn
(74) *Attorney, Agent, or Firm* — Kent S. Kokko

(57) ABSTRACT

A pre-adhesive syrup polymer composition is described comprising an acid-functional (meth)acrylate copolymer and an aminoalkyl (meth)acryloyl solvent monomer, which when polymerized, provides a pressure-sensitive adhesive and pressure-sensitive adhesive articles.

13 Claims, No Drawings

CROSSLINKABLE SYRUP COPOLYMERS WITH AMINOALKYL (METH)ACRYLOYL SOLVENT MONOMERS

CROSS REFERENCE TO RELATED APPLICATIONS

This application is a divisional of U.S. Ser. No. 12/754,121, filed Apr. 5, 2010 now U.S. Pat. No. 8,222,340, now allowed, the disclosure of which is incorporated by reference in its entirety herein.

TECHNICAL FIELD OF THE INVENTION

This invention relates to pressure-sensitive adhesives and tape articles prepared therefrom. The tapes are characterized by exhibiting an overall balance of adhesive and cohesive characteristics and exceptional load bearing capabilities at elevated temperatures.

BACKGROUND OF THE INVENTION

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY

Briefly, the present disclosure provides a pre-adhesive, curable syrup copolymer composition comprising an acid-functional (meth)acrylate solute copolymer and an aminoalkyl (meth)acryloyl solvent monomer, which when polymerized provides a pressure-sensitive adhesive composition. The pre-adhesive composition crosslinks by acid-base interactions between the acid groups of the copolymer and the amino groups of the solvent monomer.

The pressure-sensitive adhesives of this disclosure, i.e. the crosslinked compositions, provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

In some embodiments, this disclosure provides an adhesive composition derived from renewable resources. In particular, the present invention provides an adhesive composition derived, in part, from plant materials. In some embodiments, the present invention further provides an adhesive article, wherein the substrate or backing is also derived from renewable resources. The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant.

In this application "pre-adhesive" refers to the syrup composition comprising an acid-functional (meth)acrylate solute copolymer, and an aminoalkyl (meth)acryloyl solvent monomer which may be crosslinked to form a pressure-sensitive adhesive.

"Syrup polymer" refers to a solution of a solute polymer in one or more solvent monomers, the solution having a viscosity of from 500 to 10,000 cPs at 22° C.

In this application, "(meth)acrylic" is inclusive of both methacrylic and acrylic. "(Meth)acryloyl" is inclusive of methacryloyl and acryloyl; i.e. is inclusive of both esters and amides.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent.

As used herein, "aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

DETAILED DESCRIPTION

The present disclosure provides a pre-adhesive composition comprising an acid-functional (meth)acrylate copolymer and an aminoalkyl (meth)acryloyl solvent monomer, which when polymerized and crosslinked, provides a pressure-sensitive adhesive and pressure-sensitive adhesive articles.

The (meth)acrylate ester monomer useful in preparing the acid functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth) acrylate ester monomer is the ester of (meth)acrylic acid with an alcohol derived from a renewable source, such as 2-octanol, citronellol, dihydrocitronellol.

In some embodiments it is desirable for the (meth)acrylic acid ester monomer to include a high $T_g$ monomer, have a $T_g$ of at least 25° C., and preferably at least 50° C. Suitable high $T_g$ monomers include Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 85 to 99.5 parts by weight based on 100 parts total monomer content used to prepare the polymer. Preferably (meth) acrylate ester monomer is present in an amount of 90 to 95 parts by weight based on 100 parts total monomer content. When high $T_g$ monomers are included, the copolymer may include up to 30 parts by weight, preferably up to 20 parts by weight of the 85 to 99.5 parts by weight of (meth)acrylate ester monomer component. In such embodiments, the copolymer may comprise:
  i. 85 to 99.5 parts by weight of an (meth)acrylic acid ester of non-tertiary alcohol;
  ii. 0.5 to 15 parts by weight of an acid functional ethylenically unsaturated monomer;
  iii. 0 to 10 parts by weight of a non-acid functional, ethylenically unsaturated polar monomer;
  iv. 0 to 5 parts vinyl monomer; and
  v. 0 to 5 parts of a multifunctional (meth)acrylate;
  based on 100 parts by weight total monomer.

The polymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 1 to 15 parts by weight, most preferably 5 to 10 parts by weight, based on 100 parts by weight total monomer.

The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers and aminoalkyl (meth)acryloyl solvent monomers.

Representative examples of suitable polar monomers include but are not limited to 2-hydroxyethyl (meth)acrylate;

N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The polar monomer may be present in amounts of 0 to 10 parts by weight, preferably 0.5 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 to 5 parts, preferably 0.05 to 1 parts, based on 100 parts total monomers of the adhesive composition.

The pre-adhesive syrup polymer composition further comprises an aminoalkyl (meth)acryloyl solvent monomer, in addition to the (meth)acrylate copolymer. The aminoalkyl (meth)acryloyl solvent monomer is present added in amounts of 10 to 90, preferably 50 to 80 parts by weight, relative to 100 parts of the copolymer.

The aminoalkyl (meth)acryloyl solvent monomer is of the general formula:

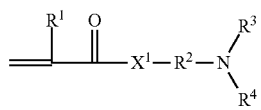

wherein
$R^1$ is H or $CH_3$;
$X^1$ is —O— or —NH—;
$R^2$ is an (hetero)hydrocarbyl group, preferably an alkylene group, preferably of 1 to 12 carbon atoms, and which is optionally substituted with a hydroxyl group;
$R^3$ is H or a $C_1$-$C_{12}$ alkyl group,
$R^4$ is a $C_1$-$C_{12}$ alkyl group or (meth)acryloylalkylene, i.e. $CH_2$=$C(R^1)$—CO—$R^5$—, where $R^5$ is a $C_2$-$C_6$ alkylene. In embodiments where $R^4$ is a (meth)acryloylalkylene group, an additional free-radical means of crosslinking is provided to the composition.

$R^2$ is a straight or branched chain alkylene preferably containing from one to about six carbon atoms. When $R^2$ is alkylene it can also contain hetero functional groups such as carbonyl, oxy, or catenary nitrogen, preferably fully substituted catenary nitrogen wherein the substituent is free of hydrogen-donor hydrogen bonding functional groups. In another embodiment $R^2$ can be arylene (e.g., 1,4-phenylene) or arylene substituted by lower alkyl or lower alkoxy $R^2$ can also be a combination of such arylene, alkenylene, and alkylene groups, such as 1,4-xylylene.

The aminoalkyl (meth)acryloyl solvent monomer of Formula I may be prepared as shown in Scheme 1.

Scheme 1

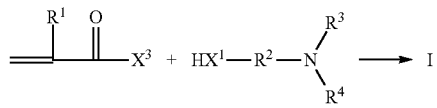

wherein
$R^1$ is H or $CH_3$;
$X^1$ is —O— or —NH—;
$R^2$ is an (hetero)hydrocarbyl group, preferably an alkylene group, which is optionally substituted with a hydroxyl group;
$R^3$ is H or a $C_1$-$C_{12}$ alkyl group,
$R^4$ is a $C_1$-$C_{12}$ alkyl group or (meth)acryloylalkylene, and
$X^3$ is an alkoxy group or a halide leaving group.

Embodiments in which $R^2$ is a hydroxyl substituted alkylene group may be prepared by the addition of a primary or secondary amine to an epoxy-containing (meth)acrylate, such as glycidyl (meth)acrylate as shown in Scheme 2:

Scheme 2

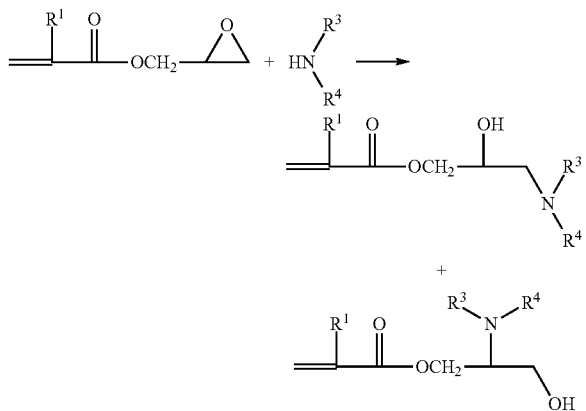

As illustrated, the nucleophilic addition of the amine may occur at either carbon atom of the epoxide group, yielding a mixture of products. Further, it is believed that the free hydroxyl groups may undergo trans-esterification—either intramolecularly or with other acrylate monomers.

The aminoalkyl (meth)acryloyl solvent monomer may be added to the extant copolymer. It is believed that the amino group of the aminoalkyl (meth)acryloyl solvent monomer reacts with the pendent acid functional groups of the acid functional (meth)acrylate copolymer to form an ionic linkage, i.e. a quaternary ammonium group. The pendent (meth) acrylate group may be subsequently free radically polymerized to crosslink the copolymer. The crosslink in the adhesive composition is an ionic crosslink (acid-base) between the amino groups and the acid groups.

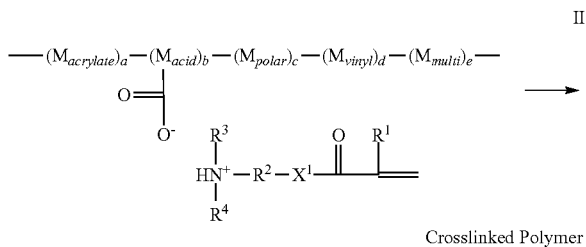

Crosslinked Polymer where $M_{acrylate}$ represents polymerized (meth)acrylate monomer units derived from (meth)acrylic acid ester of non-tertiary alcohol having "a" polymerized monomer units, $M_{acid}$ represents polymerized monomer units derived from acid functional monomers having "b" polymerized monomer units, shown as the conjugate base although the acid may be present;

$M_{polar}$ represents polymerized polar monomer units having "c" polymerized monomer units, $M_{vinyl}$ represents polymerized vinyl monomer units derived from acid functional monomers having "d" polymerized monomer units, and $M_{multi}$ represents polymerized multifunctional (meth)acrylate monomer units having "e" polymerized monomer units, and wherein a and b are at least one and c, d, and e may be zero or non-zero, and $R^1$ is H or $CH_3$;

$X^1$ is —O— or —NH—;

$R^2$ is an (hetero)hydrocarbyl group, preferably an alkylene group, which is optionally substituted with a hydroxyl group;

$R^3$ is H or a $C_1$-$C_{12}$ alkyl group, $R^4$ is a $C_1$-$C_{12}$ alkyl group or (meth)acryloylalkylene.

It will be understood that the values of subscripts a to e correspond to the amounts of the monomers in the polymerizable composition, i.e. 85 to 99.5 parts by weight of an (meth)acrylic acid ester monomer; and 0.5 to 15 parts by weight of an acid functional monomer. Other monomers may be present in the amounts previously recited. In scheme 2, the aminoalkyl (meth)acryloyl crosslinking solvent monomer is shown as the conjugate, but may be present as the base.

A preferred method of preparing acid functional (meth) acrylate copolymers comprises partially polymerizing monomers to produce a syrup polymer comprising the acid functional (meth)acrylate copolymer and unpolymerized monomers. The syrup polymer composition is polymerized to a useful coating viscosity, which may be coated onto a substrate (such as a tape backing) and further polymerized. Partial polymerization provides a coatable solution of the acid functional (meth)acrylate solute copolymer in one or more solvent monomers. Generally, the aminoalkyl (meth)acryloyl solvent monomer is added to the partially polymerized composition, then coated on a suitable substrate and further polymerized.

For syrup application processing, a preferred monomer mixture (second component) comprises 85 to 99.5 pbw of one or more (meth)acrylate ester monomers, 0.5 to 15 pbw of acid functional monomers, 0 to 10 pbw of one or more second, non-acid, polar monomers, and 0 to about 5 pbw of other vinyl monomers, based on 100 parts total monomer. The aminoalkyl (meth)acryloyl solvent monomer may be added to the extant acid functional copolymer.

The polymerizations may be conducted in the presence of, or preferably in the absence of, suitable solvents such as ethyl acetate, toluene and tetrahydrofuran which are unreactive with the functional groups of the components of the syrup polymer.

Polymerization can be accomplished by exposing the syrup polymer composition to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the solvent monomer(s).

A preferred method of preparation of the syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba Specialty Chemicals), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup polymer mixture. Such polymerizable photoinitiators are described, for example, in U.S. Pat. Nos. 5,902,836 and 5,506,279 (Babu et al.).

The syrup polymer composition and the photoinitiator may be irradiated with activating UV radiation to polymerize the monomer component(s). UV light sources can be of two types: 1) relatively low light intensity sources such as Blacklights which provide generally 10 mW/cm² or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially polymerize the syrup polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 500,000.

When preparing acid functional (meth)acrylate copolymers, it is expedient for the photoinitiated polymerization reactions to proceed to virtual completion, i.e., depletion of the monomeric components, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup polymer and formation of the crosslinked pressure-sensitive adhesives. Free radical polymerization inhibitors are often required at processing temperatures of 70° C. and higher for reaction periods of more than about 6 to 10 hours.

The copolymerizable mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The emulsion mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

Alternatively, the acid functional copolymers can be prepared by any conventional free radical polymerization method, including solution, radiation, bulk, dispersion, emulsion, and suspension processes. The separately prepared copolymer is then combined with the solvent monomer. The (meth)acrylate polymers may be prepared via suspension polymerizations as disclosed in U.S. Pat. Nos. 3,691,140 (Silver); 4,166,152 (Baker et al.); 4,636,432 (Shibano et al); 4,656,218 (Kinoshita); and 5,045,569 (Delgado). Each describes adhesive compositions, and the descriptions of polymerization processes are incorporated herein by reference.

Water-soluble and oil-soluble initiators useful in preparing the acid functional copolymers are initiators that, on exposure to heat, generate free-radicals which initiate (co)polymerization of the monomer mixture. Water-soluble initiators are preferred for preparing the (meth)acrylate polymers by emulsion polymerization. When used, initiators may comprise from about 0.05 to about 1 part by weight, preferably about 0.1 to about 0.5 part by weight based on 100 parts by weight of monomer components in the acid functional copolymers.

Polymerization of the acid functional copolymers via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof. Preferably, emulsion polymerization is carried out in the presence of anionic surfactant(s). A useful range of emulsifier concentration is from about 0.5 to about 8 weight percent, preferably from about 1 to about 5 weight percent, based on the total weight of all monomers of the emulsion pressure-sensitive adhesive.

In some embodiments, the acid functional (meth)acrylate copolymers may be prepared by solution methods. A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

It is preferable to coat the pre-adhesive syrup polymer composition soon after preparation. The pre-adhesive syrup polymer composition, (containing the copolymer, other monomers and aminoalkyl (meth)acryloyl solvent monomer), either as a syrup or solution are easily coated upon suitable substrates, such as flexible backing materials, by conventional coating techniques, then further polymerized, and cured or dried, to produce adhesive coated sheet materials. The flexible backing material may be any material conventionally utilized as a tape backing, optical film or any other flexible material.

The pressure-sensitive adhesives may also contain one or more conventional additives. Preferred additives include tackifiers, plasticizers, dyes, antioxidants, and UV stabilizers. Such additives can be used if they do not affect the superior properties of the emulsion pressure-sensitive adhesives.

If tackifiers are used, then up to about 50% by weight, preferably less than 30% by weight, and more preferably less than 5% by weight based on the dry weight of the total adhesive polymer would be suitable. In some embodiments no tackifiers may be used. Suitable tackifiers for use with (meth)acrylate polymer dispersions include rosin acids, rosin esters, terpene phenolic resins, hydrocarbon resins, and cumarone indene resins. The type and amount of tackifier can affect properties such as contactability, bonding range, bond strength, heat resistance and specific adhesion.

Adhesive articles may be prepared by coating the adhesive or pre-adhesive composition of a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure-sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The solutions may be of any desirable concentration, and degree of conversion, for subsequent coating, but is typically between 20 to 70 wt. % polymer solids, and more typically between 30 and 50 wt. % solids, in solvent. The syrup polymers may be of any desirable concentration for subsequent coating, but is typically between 5 to 20 wt. % polymer solids in solvent monomers—the solvent monomers comprising the aminoalkyl (meth)acryloyl solvent monomer and unreacted monomers of the partially polymerized solute copolymer. The desired concentration may be achieved by further dilution of the coating composition, or by partial drying.

The flexible support may also comprise a release-coated substrate. Such substrates are typically employed when an adhesive transfer tape is provided. Examples of release-coated substrates are well known in the art and include, by way of example, silicone-coated kraft paper and the like. Tapes of the invention may also incorporate a low adhesion backsize (LAB) which are known in the art.

EXAMPLES

Objects and advantages of this invention are further illustrated by the following examples. The particular materials and amounts, as well as other conditions and details, recited in these examples should not be used to unduly limit this invention.

Materials

| Designation & Abbreviations | Name | Structure | Availability |
|---|---|---|---|
| IOA | Isooctyl acrylate | | |
| 2OA | 2-Octyl acrylate | | |
| dh-CiA | Dihydrocitronellyl acrylate | | |
| AA | Acrylic Acid | | |
| Irg 651 | Irgacure 651 2,2-dimethoxy-2-phenylacetophenone | | CIBA Corporation Tarrytown, NY |
| HDDA | 1,6-hexanediol diacrylate | | |
| Aminoalkyl (Meth)acryloyl Crosslinking Agents | | | |
| I | Di(methylamino)Ethyl Acrylate DMAEA | | Aldrich CAS # [2439-35-2] |
| II | Di(methylamino)Ethyl Methacrylate DMAEMA | | Aldrich CAS # [2867-47-2] |
| III | Di(ethylamino)Ethyl Acrylate DEAEA | | Aldrich CAS # [2426-54-2] |
| IV | Di(ethylamino)Ethyl Methacrylate DEAEMA | | Aldrich CAS # [105-16-8] |

| Designation & Abbreviations | Name | Structure | Availability |
|---|---|---|---|
| V | Di(isopropylamino)Ethyl Methacrylate DIAEMA | | Scientific Polymer Products, Inc. CAS # [16715-83-6] |
| VI | Di(butylamino)Ethyl Methacrylate DBAEMA | | See prep |
| VII | GMA-DMA | | See prep |
| VIII | GMA-DEA | | See prep |
| IX | GMA-DHA | | See prep |
| X | N—Me—N,N-DEA-DA | | See prep |

Test Methods

Peel Adhesion Test [ASTM D 3330/D 3330M-04]

Two 0.5 inch strips of tape were adhered to a glass plate by rolling a 4.5 lb roller onto the tape. The two tape samples were averaged. Force was measured in Newtons per decimeter with a platen speed of 90 inches per minute. Peel adhesion data was then normalized to ounces per inch for the table below.

Shear Strength Test [ASTM D-3654/D 3654M 06, PSTC-7]

0.5 inch strips of tape were adhered by its adhesive to a stainless steel plate and cut down to a 0.5 by 0.5 inch square for room temperature or 1.0 inch by 0.5 inch square for 70° C. shears. A weight of 4.5 lbs was rolled over the adhered portion. A 1000 g load was attached to the room temperature shears and 500 g load for 70° C. shears. Each sample was suspended until failure and/or test terminated. Samples were run in triplicate and averaged for the tables below.

Preparation of Amino Alkyl Acrylates and Diacrylates

Preparation of Di(Butylamino)Ethyl Methacrylate (Compound VI)

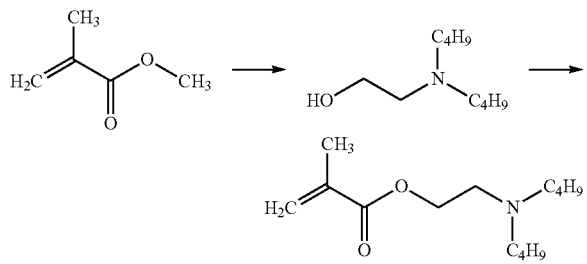

A 500 mL round bottomed flask fitted with a magnetic stirrer, heating mantle, and distillation head was charged with a mixture of methyl methacrylate (100 g, 1.0 mol, available from TCI), 2-dibutylaminoethanol (43.3 g, 0.25 mol, available from Matheson, Coleman and Bell, Norwood, Ohio), aluminum isopropoxide (5.0 g, 24 mmol, available form Alfa Aesar), and N-phenyl-1-naphthylamine (2.5 g, 11 mmol, available from Aldrich). The mixture was stirred and heated at 80° C. for one hour. The temperature of the reaction mixture was increased 10° C. per hour until a temperature of 110° C. was reached. By this time about 20 mL of material (methanol and methyl methacrylate) had distilled over from the reaction flask. The reaction mixture was left at room temperature overnight. The next day, the reaction mixture was heated at 115° C. for 2 hours and then heated at 135° C. as material distilled from the reaction flask. After 1 hour at 135° C., the desired product, di(butylamino)ethyl methacrylate, was distilled from the reaction flask at reduced pressure and collected at a temperature of 113-118° C. at 2.5 mm pressure. NMR spectral analyses confirmed the structure of the product. The boiling point reported previously for this methacrylate (U.S. Pat. No. 2,138,763 (DuPont)) is 108-109° C. at 2 mm pressure.

Preparation of Amino Alkyl Acrylates: Compounds VIII-IX

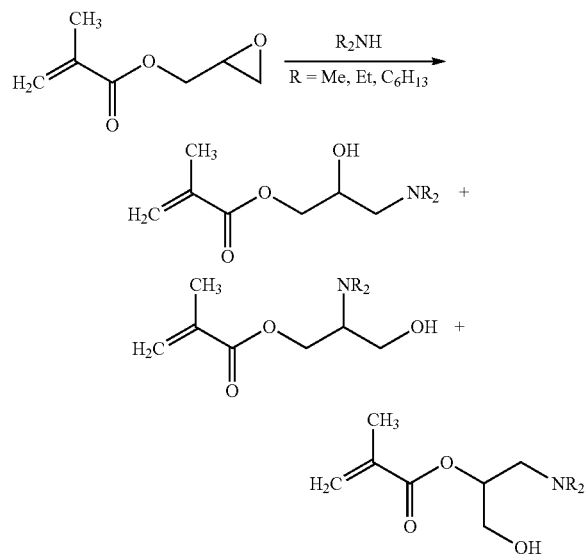

In a 4 ounce (118 mL) glass jar were mixed 100 mmol each of glycidyl methacrylate (14.2 g, available from Aldrich) and the appropriate amine. For the dimethylamine reaction, 11.2 g of a 40% solution of dimethylamine in water were added to the glycidyl methacrylate accompanied by intermittent cooling of the glass jar in an ice bath until the initial exothermic reaction had subsided. For the reactions of the other amines, 7.2 g of diethylamine (available from Aldrich) and 18.5 g of di-n-hexylamine (available from Pfaltz and Bauer, Stamford, Conn.) were utilized. The dimethylamine reaction mixture was left at room temperature overnight, while the reaction mixtures of diethylamine and di-n-hexylamine were heated at 80° C. overnight. Distillation of the reaction mixtures at reduced pressure provided the desired products, which in all cases were a mixture of isomers as shown in the above scheme.

| Product | Distillation boiling range | Literature boiling range |
|---|---|---|
| VII: GMA-DMA | 105-110° C. at 1.4 mm | 58-62° C. at 0.4-0.5 mm[a] |
| VIII: GMA-DEA | 83-105° C. at 0.25-0.40 mm | 105-110° C. at 2 mm[a] |
| IX: GMA-DHA | 153-163° C. at 0.30 mm | not reported |

[a]Bodnaryuk, F. N.; Korshunov, M. A.; Mikhlin, V. S.; *J. Org. Chem. USSR* (English translation) 1972, 8, 1368-1373.

Preparation of N-Methyl-N,N-Diethanolamine Diacrylate: Compound X

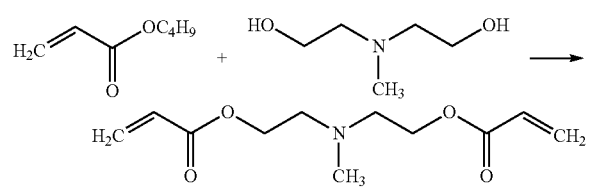

A 500 mL round bottomed flask fitted with a magnetic stirrer, heating mantle, and distillation head was charged with a mixture of butyl acrylate (231 g, 1.8 mol, available from Aldrich), N-methyldiethanolamine (35.7 g, 0.30 mol, available from Aldrich), titanium (IV) n-butoxide (8.0 g, 24 mmol, available form Alfa Aesar), and N-phenyl-1-naphthylamine (2.5 g, 11 mmol, available from Aldrich). The mixture was stirred and heated at 125° C. for 15 hour. The temperature of the reaction mixture was then increased 10° C. per hour until a temperature of 165° C. was reached. By this time about 200 mL of material (butanol and butyl acrylate) had distilled over from the reaction flask. The reaction mixture was left at room temperature overnight. The next day, additional charges of butyl acrylate (100 g, 0.78 mol), titanium (IV) n-butoxide (2.0 g, 3 mmol), and N-phenyl-1-naphthylamine (1.0 g, 4 mmol) were added and the reaction mixture was heated at 165° C. for 6 hours as material distilled from the reaction flask. The reaction mixture was then distilled at reduced pressure. Excess butyl acrylate distilled over first, followed by the desired product, N-methyl-N,N-diethanolamine diacrylate, which was collected at a temperature range of 140-145° C. at 7 mm pressure. NMR spectral analyses confirmed the structure of the product. The boiling point previously reported is 94° C. at 0.4 mm (Korshunov, M. A.; Bodnaryuk, F. N.; *J. Org. Chem. USSR* (English translation) 1968, 4, 1157-1161).

Examples 2-28, 73-75 and Comparative C1 and C72

A one quart jar was charged with 540 g of isooctyl acrylate (IOA, 90 parts), 60 g of acrylic acid (AA, 10 parts), and 0.24 g of 2,2-dimethoxy-2-phenylacetophenone photoinitiator (Irgacure™ 651, Ciba Specialty Chemicals Inc, 0.04 phr). The monomer mixture was purged with nitrogen for 20 minutes then exposed to low intensity ultraviolet radiation until a coatable syrup copolymer was prepared, after which an additional 0.96 g (0.16 phr) of the photoinitiator was added.

The pre-adhesive polymer syrup was blended with various concentrations of the dialkylamine acrylate crosslinking agent as shown in Table 2. The formulations were then coated on Mitsubishi Hostaphan™ primed polyester film at a 2 mil (~50 micrometers) thickness for the syrup pre-adhesive formulations and cured at 560 mJ/cm$^2$. The peel and shear data are shown in Table 2.

For comparative purposes, control example using no crosslinking agent (Example C1) was also prepared and tested. Peel adhesion and shear strength were measured for tapes prepared from these adhesives as described in the test methods above.

TABLE 2

| Example | Cross-linker | Amount (phr) | Shear Strength of SS (minutes) | Mode of failure | Peel adhesion (N/dm) |
|---|---|---|---|---|---|
| | | | IOA/AA 90/10 | | |
| C1 | none | — | 12 | cohesive | 107.4 |
| 2 | I | 0.2 | 32 | cohesive | 85.4 |
| 3 | I | 0.5 | 537 | cohesive | 88.8 |
| 4 | I | 1 | 10000+ | Not Failed | 86.3 |
| 5 | II | 0.2 | 51 | cohesive | 102.4 |
| 6 | II | 0.5 | 633 | cohesive | 103 |
| 7 | II | 1 | 10000+ | Not Failed | 105 |
| 8 | III | 0.2 | 17 | cohesive | 108.8 |
| 9 | III | 0.5 | 16 | cohesive | 103.2 |
| 10 | III | 1 | 28 | cohesive | 105.3 |
| 11 | IV | 0.2 | 32 | cohesive | 103.8 |
| 12 | IV | 0.5 | 51 | cohesive | 109.7 |
| 13 | IV | 1 | 515 | cohesive | 109.4 |
| 14 | V | 0.2 | 38 | cohesive | 109.3 |
| 15 | V | 0.5 | 56 | cohesive | 107 |
| 16 | V | 1 | 62 | cohesive | 108.5 |
| 17 | VI | 0.2 | 15 | cohesive | 112.7 |
| 18 | VI | 0.5 | 16 | cohesive | 115 |
| 19 | VI | 1 | 25 | cohesive | 114 |
| 20 | VII | 0.2 | 26 | cohesive | 112.4 |
| 21 | VII | 0.5 | 238 | cohesive | 108.6 |
| 22 | VII | 1 | 1933 + 4840 + 11527 | 2-bond | 100.2 |
| 23 | VIII | 0.2 | 270 | cohesive | 105.4 |
| 24 | VIII | 0.5 | 10000+ | Not Failed | 104.1 |
| 25 | VIII | 1 | 10000+ | Not Failed | 99.9 |
| 26 | IX | 0.2 | 34 | cohesive | 111.1 |
| 27 | IX | 0.5 | 198 | cohesive | 104 |
| 28 | IX | 1 | 10000+ | Not Failed | 102.4 |
| C72 | HDDA | 0.5 | 10000+ | Not failed | 85.6 |
| 73 | X | 0.20 | 10000+ | Not failed | 99.4 |
| 74 | X | 0.50 | 10000+ | Not failed | 91.5 |
| 75 | X | 1.0 | 10000+ | Not failed | 89.7 |

MOF = Failure mode legend: (co) stands for cohesive.

Examples 30-47 and Comparative C29

A one quart jar was charged with 480 g of isooctyl acrylate (IOA, 80 parts), 114 g of isobornyl acrylate (IBOA, 19 parts), 6 g of acrylic acid (AA, 1 parts), and 0.24 g of 2,2-dimethoxy-2-phenylacetophenone photoinitiator (Irgacure™ 651, Ciba Specialty Chemicals Inc, 0.04 phr). The monomer mixture was purged with nitrogen for 20 minutes then exposed to low intensity ultraviolet radiation until a coatable syrup copolymer was prepared, after which an additional 0.96 g (0.16 phr) of the photoinitiator was added.

The pre-adhesive polymer syrup was blended with various concentrations of the dialkylamino acrylate crosslinking agent as shown in Table 3. The formulations were then coated on Mitsubishi Hostaphan™ primed polyester film at a 2 mil (~50 micrometers) thickness for the syrup pre-adhesive formulations and cured at 560 mJ/cm². The peel and shear data are shown in Table 3.

For comparative purposes, control example using no crosslinking agent (Example C29) was also prepared and tested. Peel adhesion and shear strength were measured for tapes prepared from these adhesives as described in the test methods above.

TABLE 3

IOA/IBOA/AA 80/19/1

| Example | Crosslinker | Amount (phr) | Shear Strength on SS (minutes) | Mode of failure | Peel adhesion (N/dm) |
|---|---|---|---|---|---|
| C29 | NONE | | 1 | cohesive | 96.8 |
| 30 | I | 0.1 | 0 | cohesive | 96.5 |
| 31 | I | 0.2 | 1 | cohesive | 96.0 |
| 32 | II | 0.1 | 0 | cohesive | 94.8 |
| 33 | II | 0.2 | 1 | cohesive | 98.2 |
| 34 | III | 0.1 | 0 | cohesive | 98.9 |
| 35 | III | 0.2 | 0 | cohesive | 99.7 |
| 36 | IV | 0.1 | 1 | cohesive | 100 |
| 37 | IV | 0.2 | 0 | cohesive | 98.9 |
| 38 | V | 0.1 | 1 | cohesive | 101.3 |
| 39 | V | 0.2 | 0 | cohesive | 101.9 |
| 40 | VI | 0.1 | 0 | cohesive | 97.9 |
| 41 | VI | 0.2 | 0 | cohesive | 97.1 |
| 42 | VII | 0.1 | 0 | cohesive | 97.0 |
| 43 | VII | 0.2 | 0 | cohesive | 93.8 |
| 44 | VIII | 0.1 | 1 | cohesive | 91.9 |
| 45 | VIII | 0.2 | 0 | cohesive | 87.1 |
| 46 | IX | 0.1 | 0 | cohesive | 96.4 |
| 47 | IX | 0.2 | 1 | cohesive | 91.2 |

Examples 49-66 and Comparative C48

A one quart jar was charged with 570 g of 2-octyl acrylate (2-OA, 95 parts), 30 g of acrylic acid (AA, 5 parts), and 0.24 g of 2,2-dimethoxy-2-phenylacetophenone photoinitiator (Irgacure™ 651, Ciba Specialty Chemicals Inc, 0.04 phr). The monomer mixture was purged with nitrogen for 20 minutes then exposed to low intensity ultraviolet radiation until a coatable syrup copolymer was prepared, after which an additional 0.96 g (0.16 phr) of the photoinitiator was added.

The pre-adhesive polymer syrup was blended with various concentrations of the dialkylamine acrylate crosslinking agent as shown in Table 4. The formulations were then coated on Mitsubishi, Hostaphan™ primed polyester film at a 2 mil (~50 micrometers) thickness for the syrup pre-adhesive formulations and cured at 560 mJ/cm². The peel and shear data are shown in Table 4. For comparative purposes, control example using no crosslinking agent (Example C3) was also prepared and tested. Peel adhesion and shear strength were measured for tapes prepared from these adhesives as described in the test methods above.

TABLE 4

2-OA/AA 95:5

| Example | Crosslinker | Amount (phr) | Shear Strength on SS (minutes) | Mode of failure | Peel adhesion (N/dm) |
|---|---|---|---|---|---|
| C48 | None | | 3 | cohesive | 83.2 |
| 49 | I | 0.2 | 4 | cohesive | 83.3 |
| 50 | I | 0.5 | 9 | cohesive | 68.3 |
| 51 | II | 0.2 | 2 | cohesive | 86.7 |
| 52 | II | 0.5 | 9 | cohesive | 86.8 |
| 53 | III | 0.2 | 2 | cohesive | 85.2 |
| 54 | III | 0.5 | 3 | cohesive | 86.3 |
| 55 | IV | 0.2 | 3 | cohesive | 86.9 |
| 56 | IV | 0.5 | 3 | cohesive | 87.4 |
| 57 | V | 0.2 | 3 | cohesive | 87.6 |
| 58 | V | 0.5 | 3 | cohesive | 87 |
| 59 | VI | 0.2 | 3 | cohesive | 86.5 |
| 60 | VI | 0.5 | 3 | cohesive | 88.9 |
| 61 | VII | 0.2 | 3 | cohesive | 85.2 |
| 62 | VII | 0.5 | 8 | cohesive | 84.8 |

TABLE 4-continued

2-OA/AA 95:5

| Example | Crosslinker | Amount (phr) | Shear Strength on SS (minutes) | Mode of failure | Peel adhesion (N/dm) |
|---|---|---|---|---|---|
| 63 | VIII | 0.2 | 25 | cohesive | 91.4 |
| 64 | VIII | 0.5 | 242 | cohesive | 87.5 |
| 65 | IX | 0.2 | 4 | cohesive | 90.3 |
| 66 | IX | 0.5 | 11 | cohesive | 87.3 |

Examples 68-71 and Comparative C67 and C76

A one quart jar was charged with 540 g of 2-octyl acrylate (2-OA, 90 parts), 60 g of acrylic acid (AA, 10 parts), and 0.24 g of 2,2-dimethoxy-2-phenylacetophenone photoinitiator (Irgacure™ 651, Ciba Specialty Chemicals Inc, 0.04 phr). The monomer mixture was purged with nitrogen for 20 minutes then exposed to low intensity ultraviolet radiation until a coatable syrup copolymer was prepared, after which an additional 0.96 g (0.16 phr) of the photoinitiator was added.

The pre-adhesive polymer syrup was blended with various concentrations of the dialkylamine acrylate crosslinking agent as shown in Table 5. The formulations were then coated on Mitsubishi, Hostaphan™ primed polyester film at a 2 mil (~50 micrometers) thickness for the syrup pre-adhesive formulations and cured at 560 mJ/cm². The peel and shear data are shown in Table 5. For comparative purposes, control example using no crosslinking agent (Example C67 and C76) was also prepared and tested. Peel adhesion and shear strength were measured for tapes prepared from these adhesives as described in the test methods above.

TABLE 5

2-OA/AA 90:10

| Example | Crosslinker | Amount (phr) | Shear Strength on SS (minutes) | Mode of failure | Peel adhesion (N/dm) |
|---|---|---|---|---|---|
| C67 | NONE |  | 624 | cohesive | 92 |
| 68 | II | 1 | 10000+ | Not failed | 82 |
| 69 | IV | 1 | 2069 | cohesive | 90 |
| 70 | VII | 1 | 10000+ | Not failed | 82 |
| 71 | VIII | 1 | 10000+ | Not failed | 89 |
| C76 | HDDA | 0.5 | 10000+ | Not failed | 81 |
| 78 | X | 0.20 | 10000+ | Not failed | 125 |
| 79 | X | 0.50 | 10000+ | Not failed | 75 |
| 80 | X | 1.0 | 10000+ | Not failed | 103 |

Examples 81-82

A sixteen-ounce (~473 mL) jar was charged with 450 g of dihydrocitronellyl (dh-CiA, 90 parts), 50 g of acrylic acid (AA, 10 parts), and 0.2 g of 2,2-dimethoxy-2-phenylacetophenone photoinitiator (Irgacure 651, 0.04 phr). The monomer mixture was purged with nitrogen for 20 minutes then exposed to low intensity ultraviolet radiation until a coatable syrup copolymer was prepared, after which an additional 0.8 g (0.16 phr) of the photoinitiator was added.

The pre-adhesive polymer syrup was blended with various concentrations of the DMAEA as shown in examples 81-82 and is based on the weight percent of pre-adhesive polymer syrup. The formulations were then coated on Mitsubishi Hostaphan™ primed polyester film at a 2-mil (~50 micrometers) thickness for the syrup pre-adhesive formulations and cured at 500 mJ/cm². Peel adhesion and shear strength were measured for as described in the test methods above. Shear was measured at room temperature.

TABLE 6 dh-CiA/AA 90:10

| Ex | Crosslinker | Amount (phr) | Shear Strength on SS (minutes) | Mode of failure | Peel adhesion (N/dm) |
|---|---|---|---|---|---|
| 81 | I | 0.1 | 983 | cohesive | 75.5 |
| 82 | I | 0.3 | 5140 | cohesive | 68.7 |

The invention claimed is:

1. A polymer composition comprising the reaction product of:
   a) a solute copolymer comprising
      i. 85 to 99.5 parts by weight of an (meth)acrylic acid ester of non-tertiary alcohol;
      ii. 0.5 to 15 parts by weight of an acid functional monomer;
      iii. 0 to 10 parts by weight of a non-acid functional, ethylenically unsaturated polar monomer;
      iv. 0 to 5 parts vinyl monomer, with
   (b) a solvent monomer of the formula:

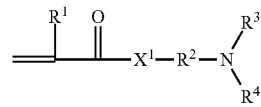

wherein
$R^1$ is H or $CH_3$;
$X^1$ is —O— or —NH—;
$R^2$ is a (hetero)hydrocarbyl group,
$R^3$ is H or a $C_1$-$C_{12}$ alkyl group,
$R^4$ is a $C_1$-$C_{12}$ alkyl group or (meth)acryloylalkylene.

2. The polymer composition of claim 1, wherein the solute copolymer of the formula:

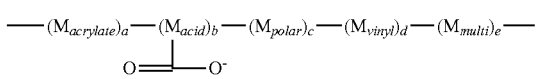

where
$M_{acrylate}$ represents polymerized multifunctional (meth)acrylate monomer units derived from (meth)acrylic acid ester of non-tertiary alcohol having "a" polymerized monomer units,
$M_{acid}$ represents polymerized monomer units derived from acid functional monomers having "b" polymerized monomer units,
$M_{polar}$ represents polymerized polar monomer units having "c" polymerized monomer units,
$M_{vinyl}$ represents polymerized vinyl monomer units derived from acid functional monomers having "d" polymerized monomer units, and
$M_{multi}$ represents polymerized multifunctional (meth)acrylate monomer units having "e" polymerized monomer units, and
wherein a and b are at least one and c, d, and e may be zero or non-zero.

3. The polymer composition of claim 1, wherein the room temperature modulus is less than $3 \times 10^6$ dynes/cm at a frequency of 1 Hz.

4. The polymer composition of claim 1, wherein said solute copolymer comprises 0.5 to 5 parts by weight of acrylic acid and 1 to 5 parts by weight of a non-acid functional, ethylenically unsaturated monomer.

5. The polymer composition of claim 2, wherein the acid functional monomer is selected from the group consisting of acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropane sulfonic acid, vinyl phosphonic acid, and mixtures thereof.

6. The polymer composition of claim 1 comprising 1 to 5 parts of a vinyl monomer selected from the group consisting of vinyl esters, styrene, substituted styrene, vinyl halide, vinyl propionate, and mixtures thereof.

7. The polymer composition of claim 1 with the average number of carbon atoms of the non-tertiary alcohol being from about 4 to about 12.

8. The polymer composition of claim 1, wherein said non-tertiary alcohol of said (meth)acrylic acid ester of non-tertiary alcohol is selected from 2-octanol or dihydrocitronellol.

9. The polymer composition of claim 1, wherein said solute copolymer comprises 0.5 to 5 parts by weight of non-acid functional, ethylenically unsaturated polar monomers.

10. The composition of claim 9 wherein said non-acid functional, ethylenically unsaturated polar monomer is selected from the group consisting of 2-hydroxyethyl (meth)acrylate; N-vinylpyrrolidone; N-vinylcaprolactam; acrylamide; t-butyl acrylamide; dimethylamino ethyl acrylamide; N-octyl acrylamide; poly(alkoxyalkyl) (meth)acrylates; poly(vinyl methyl ether); and mixtures thereof.

11. The polymer composition of claim 1 comprising 0.5 to 15 parts by weight of acid functional ethylenically unsaturated monomers.

12. The polymer composition of claim 1 comprising 1 to 5 parts by weight of vinyl monomers.

13. The polymer composition of claim 1 comprising 0.01 to 5 parts of a multifunctional (meth)acrylate.

* * * * *